Figure 1:
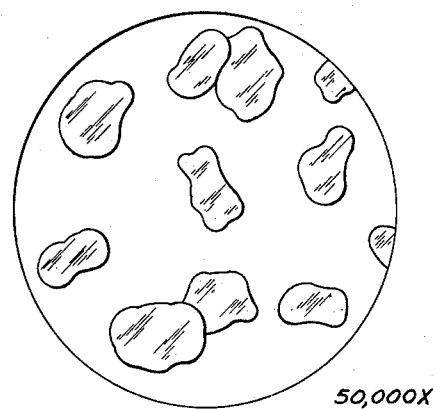

INVENTOR.
WALTER R. WHATELY

United States Patent Office 3,127,280
Patented Mar. 31, 1964

3,127,280
TREATMENT OF TITANIUM DIOXIDE
Walter R. Whately, Lynchburg, Va., assignor to American Cyanamid Company, New York, N.Y., a corporation of Maine
Filed Dec. 16, 1960, Ser. No. 76,240
13 Claims. (Cl. 106—300)

The present invention relates to titanium dioxide pigment of improved chalk resistance and to processes for the manufacture thereof.

Paint, enamel and lacquer films containing ordinary (untreated) titanium dioxide pigment undergo rapid disintegration during outdoor weathering, and this pigment is therefore commonly said to possess "poor chalk resistance." The distintegration takes place continuously at the surface of the films, resulting in continuous release of titanium dioxide pigment which gives the films a powdery or chalky appearance during their lives.

The ultimate cause of this disintegration is sunlight, but the immediate cause is not known. However, it is generally believed that a photo-oxidation step is involved in which the pigment acts as catalyst (cf. Barksdale, "Titanium," New York, N.Y., 1949, chapt. 15, and Whately U.S. Patent No. 2,671,031 of 1954).

The poor weatherability imparted to films by titanium dioxide is perhaps the single most disadvantageous property of this pigment, and a major technical effort has been made to improve the pigment in this regard; cf. Gardner U.S. Patent No. 1,984,168 (1933), Patterson U.S. Patent No. 2,187,050 (1940), and Miller U.S. Patent No. 2,668,776 (1954).

The discovery has now been made that titanium dioxide pigment is improved as to chalk resistance by the presence of a small amount of a highly particulate insoluble hydrous titanic phosphate on the particles thereof. It has further been discovered that the hydrous titanium phosphate does not mask or inhibit to a significant extent the antichalking properties imparted by polyvalent metal oxides which have heretofore been used for the purpose.

It is not known precisely how the hydrous titanic phosphate is associated with the pigment so as to improve its chalk resistance. However, a laboratory electron photomicrograph of one preferred pigment according to the present invention has shown that at least a part and evidently the effective part of the hydrous titanic phosphate is present as discrete particles (estimated as $0.01\mu$ in average diameter) on the surface of the pigment, giving the pigment particles (themselves only about $0.2\mu$ to $0.4\mu$ in diameter) a surface roughness or asperity.

The hydrous titanic phosphates present on the surfaces of pigment of the present invention are a known class of salts. They are gels or gelatinous precipitates containing roughly 10% to 20% by weight of water not removable by drying at 110° C. but removable by calcination, at temperatures up to 500°–1000° C. They may contain minor amounts (less than 5% based on the weight of the $TiO_2$) of cations other than titanium (for example calcium, sodium and aluminum) and anions other than phosphate (for example sulfate, chloride and nitrate), depending on the particular starting materials from which they are prepared.

Titanium dioxide pigment benefited by the the present invention may be sulfate-process pigment or pigment produced by combustion of titanium tetrachloride with oxygen.

The pigment of the present invention is most easily prepared by forming an aqueous slurry of titanium dioxide pigment, preferably from which oversized (nonpigmentary) particles have been removed by hydroclassification, and precipitating a small amount of hydrous titanic phosphate in said slurry. The hydrous titanic phosphate precipitates largely as discrete particles of sub-pigmentary dimensions, which at least in large part form an intimate mixture with the pigment particles as a rough deposit thereon. The reason why the hydrous titanic phosphate particles deposit themselves on the titanium dioxide pigment particles is not known, and applicant does not wish to be bound by any theory.

Figure 2:
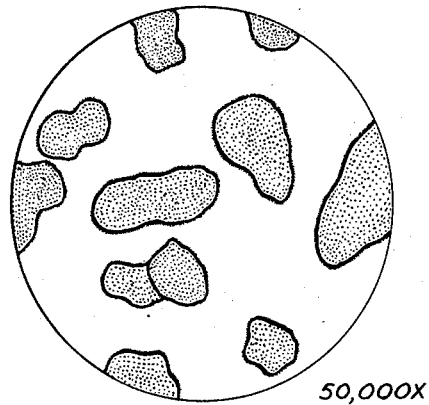

The pigment of the present invention is illustrated in the drawing, wherein:

FIGURE 1 is a drawing made from an electron photomicrograph at 50,000 diameters of ordinary untreated titanium dioxide pigment, and FIGURE 2 is a drawing made from an electron photomicrograph at 50,000 diameters of the pigment of FIGURE 1 treated according to the present invention.

In FIGURE 1, the particles (which are titanium dioxide pigment "ultimate" particles about $0.2\mu$–$0.4\mu$ in average dimensions) have smooth and perhaps fused surfaces. In FIGURE 2, the same particles have a rough appearance resulting from the presence of hydrous titanic phosphate on the surface thereof.

The effectiveness of the hydrous titanic phosphate does not significantly depend on the temperature at which it is formed, so that the treatment may be undertaken while the pigment slurry is at normal room temperature, with resulting economies.

The hydrous titanic phosphate is conveniently precipitated by slurrying the titanium dioxide in aqueous medium having a dissolved content of a titanic salt, for example titanic sulfate, titanyl sulfate, titanic nitrate and mixtures thereof, and adding an aqueous solution of a phosphatic compound. A metathesis takes place causing precipitation of a hydrous titanic phosphate on the pigment particles. The precipitated hydrous titanic phosphate is substantially insoluble over the entire pH range. It is insoluble in the substantially neutral pH range of 6–8 and is very difficult to separate mechanically from the pigment. This is an important advantage because the treated slurry may be neutralized, and because the pigment may be washed with water to remove any soluble salts present and subjected to milling in a fluid energy mill to break up the pigment sinters or aggregates which are often present.

In the process, if desired, the amount of phosphatic compound added may be less than that sufficient to precipitate all the titanium present. In such event, the unprecipitated titanium need not be lost but is precipitated as a hydrous titania when the slurry is neutralized, and adds to the chalk resistance imparted by the hydrous titanic phosphate.

Moreover, it is within the scope of the invention to add to the slurry hydrolyzable salts of aluminum, tin, zirconium, chromium, lead and other metals known to promote chalk resistance, and to precipitate hydrous oxides therefrom before or after hydrous titanic phosphate has been precipitated in the slurry, or simultaneously therewith. The chalk resistance of these hydrous oxides supplements and does not mask the chalk resistance imparted by the hydrous titanic phosphate.

However, if desired, the phosphatic compound may be added to the pigment slurry first, and precipitation effected by subsequent addition of the titanium salt solution. The weight of hydrous titanic phosphate precipitated in any one instance is readily determined by running the reaction in the absence of pigment, and weighing the precipitate formed. The reaction goes to substantial completion within a few minutes.

The pigment may be treated by forming a slurry of titanium dioxide in an aqueous medium having a dissolved content of a hydrolyzable titanic halide, for example titanium tetrachloride, and precipitating at least part of the titanium therein by adding a phosphatic compound. The slurry can then be neutralized and processed as described.

A particular advantage resulting from the use of titanium tetrachloride as the source of titanium in the treatment is that the slurry can be neutralized at least partially, with a low-cost calcium base, for example calcium hydroxide, calcium bicarbonate, and calcium carbonate, without contamination of the pigment because the neutralization product in such event is calcium chloride which is water-soluble and is removed in the washing step.

The minimum and maximum effective amounts of hydrous titanic phosphate have not been determined, but very satisfactory results have been obtained in the range of 1% to 3% of hydrous titanic phosphate calculated as $2(TiO_2)P_2O_5$ on the $TiO_2$ content of the pigment, and this range is therefore preferred. However, a distinct improvement in chalk resistance has been caused by the presence of 0.1% of the hydrous titanic phosphate and not more than about 5% has been needed to effect about maximum improvement, so that the invention does not depend primarily upon specific amounts.

The invention will be further illustrated by the examples which are specific preferred embodiments of this invention and which are not to be construed as limitations thereon.

*Example 1*

The following illustrates the preparation of titanium dioxide pigment of improved chalk resistance resulting from the presence of a small amount of an insoluble hydrous titanic phosphate on the particles thereof.

A slurry containing 20% by weight of rutile titanium dioxide pigment which has been hydroclassified to remove oversized (non-pigmentary) particles is warmed to 30° C. and a 4,000-g. aliquot is removed. To this is added 64 ml. of a solution containing titanic sulfate in amount equivalent to 125 g./l. of $TiO_2$ and 400 g./l. of $H_2SO_4$. There is then added slowly through a dropping funnel with rapid stirring 56 ml. of an aqueous solution containing 100 g./l. of orthophosphoric acid.

The titanium of the titanic sulfate is precipitated as a hydrous titanium phosphate. An electron photomicrograph shows that the precipitated hydrous titanic phosphate particles are largely uniformly deposited on the surface of the titanium dioxide particles giving the surface a roughened appearance; the diameter of the deposited particles is estimated as about $0.01\mu$. Calculations indicate that the weight of the precipitated hydrous titanium phosphate, calculated as $2(TiO_2).P_2O_5$, is 1.5% of the weight of the titanium dioxide.

The slurry is then neutralized to pH 8.0 with sodium hydroxide and the liquid phase filtered off. The resulting pigment cake is washed to remove sodium sulfate and any other soluble salts present, oven-dried at 110° C., and milled in a fluid energy mill supplied with superheated steam.

The resulting pigment is tested by the method of Examples 3 and 4 of Marcot et al., U.S. Patent No. 2,766,133 (1956), wherein the pigment is formulated into linseed oil and exposed on panels to weathering in a standard laboratory weathering unit in comparison with panels carrying paint prepared in the same way from control (untreated) pigment.

The chalk resistance of the paint carrying the treated pigment is about twice the chalk resistance of the paint containing the control pigment.

Substantially identical results are obtained when the pigment is treated at 70° C.

*Example 2*

The following illustrates the preparation of titanium dioxide pigment of superior chalk resistance resulting from the presence of small amounts of an insoluble hydrous titanic phosphate and hydrous alumina on the particles thereof.

The procedure of Example 1 is repeated through the step in which the orthophosphoric acid is added, forming a deposit of hydrous titanic phosphate on the pigment particles.

There is then added slowly with rapid stirring 160 ml. of an aqueous solution containing 325 g./l. of $Al_2(SO_4)_3$. The slurry is then neutralized to pH 8.0 by addition of sodium hydroxide, forming a deposit of hydrous alumina on the particles. The remainder of the procedure of Example 1 is then repeated.

At the end of 376 hours in the accelerated weathering instrument, the paint pigmented with titanium dioxide in admixture with both hydrous titanic phosphate and hydrous alumina has a rating of 8 on a scale where a rating of 10 represents no perceptible chalking and a rating of 0 represents very bad chalking. The paint carrying the control pigment reaches a rating of 0 on the same scale after 200 hours of exposure.

These results show that the chalk resistance of the pigment of the present invention is not harmed by but is considerably improved by the hydrous alumina.

*Example 3*

To 4,000 g. of an aliquot corresponding to that used for Example 1 at 20° C. is added with rapid stirring 40 g. of a 47.5% by weight solution of titanium tetrachloride in water, followed by 230 cc. of a 10% by weight solution of $Na_3PO_4.12H_2O$. Stirring is continued for 30 minutes. Substantially all of the titanium of the titanium tetrachloride precipitates as a hydrous titanic phosphate. The slurry is neutralized with aqueous sodium hydroxide, and the pigment is washed and jet milled as described in Example 1. The chalk resistance of the finished pigment is substantially the same as that of the pigment product of Example 1.

*Example 4*

The process of Example 3 is repeated, except that the slurry is neutralized to about pH 6 with the lime, the final adjustment to pH 7 being made with sodium hydroxide solution.

Substantially the same pigment is obtained.

I claim:

1. Titanium dioxide pigment of improved chalk resistance resulting from the presence of at least about 0.1% of an insoluble hydrous titanic phosphate on the particles thereof.

2. Pigment according to claim 1 wherein the weight of said phosphate calculated as $2(TiO_2).P_2O_5$ is between 1% and 3% of the weight of the $TiO_2$ content of said pigment.

3. Titanium dioxide pigment of improved chalk resistance resulting from the presence of about 0.1% to 5% of an insoluble hydrous titanic phosphate and hydrous titania on the particles thereof.

4. Titanium dioxide pigment of improved chalk resistance resulting from the presence of about 0.1 to 5% of an insoluble hydrous titanic phosphate and an insoluble hydrous alumina on the particles thereof.

5. A process for the manufacture of titanium dioxide pigment of improved chalk resistance, which comprises forming an aqueous slurry of titanium dioxide pigment and precipitating about 0.1% of a hydrous titanic phosphate in said slurry.

6. A process for the manufacture of titanium dioxide pigment of improved chalk resistance, which comprises forming a slurry of titanium dioxide pigment in aqueous medium having a dissolved content of a titanic salt, adding an aqueous solution of water-soluble phosphatic compound thereby precipitating a small amount of a hydrous titanic phosphate sufficient to provide a finished product containing about 0.1 to 5% of the same, neutralizing said slurry, and washing said pigment to remove soluble salts therefrom.

7. A process according to claim 6 wherein the added phosphatic compound is orthophosphoric acid.

8. A process according to claim 6 wherein the added phosphatic compound is trisodium phosphate.

9. A process for the manufacture of titanium dioxide pigment of improved chalk resistance, which comprises forming an aqueous slurry of titanium dioxide pigment having a small content of a titanic salt, adding a water-soluble phosphatic compound in amount sufficient to precipitate a part but not all of the titanium of said titanic salt, the quantity of titanium so precipitated being at least about 0.1% hydrous titanic phosphate based on the weight of the pigment, and neutralizing said slurry, thereby precipitating the remainder of the titanium of said titanic salt as hydrous titania.

10. A process for the manufacture of titanium dioxide pigment of improved chalk resistance, which comprises forming an aqueous slurry of titanium dioxide pigment having a small dissolved content of a titanic salt, precipitating a part of the titanium of said titanic salt by addition of a water-soluble phosphatic compound, the quantity of titanium so precipitated being at least about 0.1% hydrous titanic phosphate based on the weight of the pigment, adding a water-soluble aluminum salt, and neutralizing said slurry.

11. A process for the manufacture of titanium dioxide pigment of improved chalk resistance, which comprises forming an aqueous slurry of titanium dioxide pigment, precipitating at least about 0.1% of a hydrous titanic phosphate in said slurry, and, in a subsequent step, jet milling said pigment.

12. A process for the manufacture of titanium dioxide pigment of improved chalk resistance, which comprises forming a slurry of titanium dioxide pigment in aqueous medium having a dissolved content of titanium tetrachloride, adding a phosphatic compound in amount sufficient to precipitate a small amount of the titanium of said titanium tetrachloride, the quantity of titanium so precipitated being at least about 0.1% hydrous titanic phosphate based on the weight of the pigment, and neutralizing said slurry.

13. A process according to claim 12 wherein the slurry is neutralized by addition of a calcium base.

References Cited in the file of this patent

UNITED STATES PATENTS

| | | |
|---|---|---|
| 1,876,065 | Llewellyn et al. | Sept. 6, 1932 |
| 1,953,777 | Sakiatwalla et al. | Apr. 3, 1934 |
| 2,772,244 | Shalit et al. | Nov. 27, 1956 |
| 2,817,595 | Kalinowski | Dec. 24, 1957 |
| 2,819,177 | Conn et al. | Jan. 7, 1958 |

FOREIGN PATENTS

| | | |
|---|---|---|
| 290,684 | Great Britain | May 17, 1928 |

UNITED STATES PATENT OFFICE
CERTIFICATE OF CORRECTION

Patent No. 3,127,280                          March 31, 1964

Walter R. Whately

It is hereby certified that error appears in the above numbered patent requiring correction and that the said Letters Patent should read as corrected below.

Column 4, line 62, after "precipitating" insert -- at least --.

Signed and sealed this 21st day of July 1964.

(SEAL)

Attest:

ESTON G. JOHNSON
Attesting Officer

EDWARD J. BRENNER
Commissioner of Patents